United States Patent [19]

Drent

[11] Patent Number: 4,804,739

[45] Date of Patent: Feb. 14, 1989

[54] PROCESS FOR PREPARING CARBON MONOXIDE POLYMER WITH QUATERNARY PHOSPHONIUM COMPOUND BIDENTATE LIGAND

[75] Inventor: Eit Drent, Amsterdam, Netherlands

[73] Assignee: Shell Oil Company, Houston, Tex.

[21] Appl. No.: 66,160

[22] Filed: Jun. 25, 1987

[30] Foreign Application Priority Data

Jul. 1, 1986 [NL] Netherlands .................. 8601713

[51] Int. Cl.$^4$ .................................................. C08G 67/02
[52] U.S. Cl. .................................................. 528/392
[58] Field of Search ........................................ 528/392

[56] References Cited

U.S. PATENT DOCUMENTS

| | | | |
|---|---|---|---|
| 3,448,140 | 6/1969 | Gamlen | 260/471 |
| 3,689,460 | 9/1972 | Nozaki | 260/63 |
| 3,694,412 | 9/1972 | Nozaki | 260/63 |
| 3,835,123 | 9/1974 | Nozaki | 260/94.9 |
| 3,914,391 | 10/1975 | Nozaki | 423/364 |
| 3,919,272 | 11/1975 | Knifton | 260/410.9 R |
| 3,984,388 | 10/1976 | Shryne et al. | 260/63 |
| 4,076,911 | 2/1978 | Fenton | 526/11.1 |
| 4,414,409 | 11/1983 | Waller | 560/233 |
| 4,474,978 | 10/1984 | Drent | 560/24 |
| 4,599,476 | 7/1986 | Drent | 585/511 |
| 4,634,793 | 1/1987 | Drent | 560/243 |

FOREIGN PATENT DOCUMENTS

| | | |
|---|---|---|
| 8665793 | 11/1987 | Australia . |
| 019483 | 11/1980 | European Pat. Off. . |
| 121965 | 8/1984 | European Pat. Off. . |
| 181014 | 5/1986 | European Pat. Off. . |
| 229408 | 7/1987 | European Pat. Off. . |
| 1081304 | 3/1965 | United Kingdom . |
| 2058074 | 8/1979 | United Kingdom . |

OTHER PUBLICATIONS

Encyclopedia of Polymer Science and Technology, 1968, vol. 9, 397–402, J. Am. Chem. Soc. 1982, 104, 3520–3522.
Organometallics 1984, 3, 866–870.
Adv. Polym. Sci. 1986, 73–4, 125–144.

Primary Examiner—Harold D. Anderson

[57] ABSTRACT

This invention relates to an improved process of producing linear alternating polymers of carbon monoxide and at least one ethylenically unsaturated hydrocarbon and to a catalyst composition containing certain quaternary phosphonium salts useful in the polymerization process.

7 Claims, No Drawings

PROCESS FOR PREPARING CARBON MONOXIDE POLYMER WITH QUATERNARY PHOSPHONIUM COMPOUND BIDENTATE LIGAND

This invention relates to an improved process of producing polymers of carbon monoxide and at least one ethylenically unsaturated hydrocarbon. The invention further contemplates novel catalyst compositions incorporating certain quaternary phosphonium salts as catalyst composition components.

High molecular weight polymers of carbon monoxide and one or more ethylenically unsaturated hydrocarbon are known as polyketones. These copolymers are linear alternating polymers of carbon monoxide and at least one ethylenically unsaturated hydrocarbon polymerized through the ethylenic unsaturation of the hydrocarbon. For example, when the ethylenically unsaturated hydrocarbon is ethylene, the copolymer consists of units of the formula $-CO(C_2H_4)-$. The polyketones are typically prepared by reacting carbon monoxide and the ethylenically unsaturated hydrocarbon(s) in the presence of a catalyst composition formed from a Group VIII metal, e.g., palladium, the anion of a non-hydrohalogenic acid having a pKa less than about 6 and certain bidentate phosphorus or nitrogen ligands.

For some polymerization applications, the anion catalyst component is usefully provided in the form of the free acid. In other applications the anion is provided as the salt of the acid. A variety of metal salts have been shown to be useful as the source of the anion, employed alone or in conjunction with ethers, quinones or carboxylic compounds such as ketones or esters. However, for some applications an alternative to the use of salts containing metal moieties would be desirable.

SUMMARY OF THE INVENTION

The process of the invention comprises the production of linear alternating polymers by polymerization of carbon monoxide and at least one ethylenically unsaturated hydrocarbon in the presence of a catalyst composition prepared from a palladium compound, certain non-metallic salts containing an anion of a non-hydrohalogenic acid having a pKa less than 6 and a bidentate phosphorus or nitrogen ligand of defined formula. It has been found that certain quaternary phosphonium salts are effective catalyst composition components whereas quaternary ammonium compounds are not effective. The invention further comprises the novel catalyst compositions containing quaternary phosphonium salts, which compositions are useful in the polymerization process.

DESCRIPTION OF THE INVENTION

In the process of the invention, carbon monoxide is polymerized with at least one ethylenically unsaturated hydrocarbon. Preferred hydrocarbons are hydrocarbons from 2 to 20 carbon atoms inclusive, more preferably from 2 to 10 carbon atoms inclusive. Such hydrocarbons are wholly aliphatic including ethylene and other α-olefins such as propylene, butene-1 and octene-1, or are arylaliphatic containing an aryl substituent on a carbon atom of the ethylenic unsaturation such as styrene, p-methylstyrene and p-ethylstyrene. Preferred embodiments of the process of the invention prepare copolymers of carbon monoxide and ethylene or terpolymers of carbon monoxide, ethylene and a second aliphatic α-olefin, particularly propylene.

The molar ratio of unsaturated hydrocarbon to carbon monoxide in the polymerization mixture varies from about 10:1 to about 1:5, preferably from about 5:1 to about 1:2. When ethylene and a second olefinically unsaturated hydrocarbon are employed to produce a terpolymer with carbon monoxide, the molar ratio of ethylene to second unsaturated hydrocarbon is from about 400:1 to about 1:1 with ratios from about 100:1 to about 2:1 being preferred.

The palladium compound employed in the novel catalyst composition of the invention is a palladium salt of an organic acid, preferably a carboxylic acid of up to about 10 carbon atoms. In part because of ease of procurement, palladium acetate is a particularly preferred source of palladium although palladium propionate or palladium hexanoate are also suitable.

In the process of the invention, the anion of the non-hydrohalogenic acid of pKa less than about 6 is provided in the form of a quaternary phosphonium salt. The quaternary phosphonium salts useful in the catalyst compositions of the invention are salts of the formula $Z_4PA$ wherein A is the anion of a non-hydrohalogenic acid having a pKa less than 6, preferably less than 2 (as determined in aqueous solution at 18° C.), and Z independently is hydrocarbyl of from 1 to 20 carbon atoms inclusive, preferably from 1 to 10 carbon atoms inclusive.

The anion A is preferably the anion of an oxygen-containing acid illustrated by inorganic acids such as sulfuric acid or perchloric acid or organic acids such as carboxylic acids, e.g., trichloroacetic acid, trifluoroacetic acid or difluoroacetic acid, or a sulfonic acid such as methanesulfonic acid, trifluoromethanesulfonic acid and para-toluenesulfonic acid. Trifluoroacetic acid and para-toluenesulfonic acid constitute a preferred class of acids whose anion A is a portion of the quaternary phosphonium salts.

The groups Z are independently alkyl, cycloalkyl or aryl and are the same groups or are different. Illustrative alkyl Z groups are methyl, ethyl, butyl dodecyl and benzyl, cycloalkyl Z groups include cyclohexyl and cyclooctyl and aryl Z groups include phenyl and naphthyl. Examples of suitable quaternary phosphonium salts are tetramethylphosphonium salts, tetraethylphosphonium salts, dicyclohexyldiphenylphosphonium salts, benzyltriphenylphosphonium salts, tetraphenylphosphonium salts and methyltriphenylphosphonium salts. Preferred phosphonium salts are those in which at least 1 and preferably up to 3 of the Z groups are phenyl. Particularly useful are the alkyltriphenylphosphonium salts, especially methyltriphenylphosphonium salts.

The quaternary phosphonium salt is utilized in a catalytic quantity from about 0.5 to about 200 equivalents of salt per gram atom of palladium (as the compound), preferably from about 1 to about 100 equivalents of salt per gram atom of palladium.

The bidentate ligand useful as a catalyst composition component is selected from bidentate ligands of phosphorus and bidentate ligands of nitrogen. In the case of bidentate phosphorus ligands, suitable ligands are represented by the formula $$R^1R^2-P-R-P=R^3R^4$$

wherein $R^1$, $R^2$, $R^3$ and $R^4$ independently are organic radicals of from 1 to 14 carbon atoms inclusive, but preferably are aryl, alkaryl or alkoxyaryl of 6 to 14 carbon atoms inclusive such as phenyl, tolyl, p-methoxyphenyl and 2,4-dimethyphenyl. The group R is a divalent bridging group of up to 20 carbon atoms with up to three carbons in the phosphorus-phosphorus bridge and is hydrocarbyl or substituted hydrocarbyl wherein any substituent is $di(R^1)P$-alkyl. The preferred R group is $-CH_2-CH_2-CH_2-$. Examples of suitable bidentate phosphorus ligands are 1,3-bis(di-p-tolylphosphino)propane, 1,3-bis(di-p-methoxyphenylphosphino)propane, 1,3-bis(diphenylphosphino)propane and 2-methyl-2-(methyldiphenylphosphino)-1,3-bis(diphenylphosphino)propane. The preferred bidentate phosphorus ligand is 1,3-bis(diphenylphosphino)propane. When a bidentate phosphorus ligand is used as the bidentate ligand of the catalyst composition it is used in a quantity from about 0.1 to about 5 mol per mol of palladium compound, preferably from about 0.5 mol to about 5 mol per mol of palladium compound, preferably from about 0.5 mol to about 1.5 mol per mol of palladium compound.

The bidentate nitrogen ligands of the invention are ligands of the formula

wherein X and Y independently are bridging groups of from 2 to 10 carbon atoms inclusive with from 3 to 4 atoms in the bridge, at least two of which are carbon atoms with any other atoms in the bridge being nitrogen atoms. Illustrative classes of such bidentate nitrogen ligands are the 2,2'bipyridines, the 1,10-phenanthrolines, the 2,2'-biquinilones, the 2(2-pyridyl)benzimidazoles and the 3-(2-pyridyl)-5,6-diphenyl-1,2,4-triazines.

The preferred class of bidentate nitrogen ligands are the 2,2'-bipyridines wherein the ring carbon atoms are unsubstituted or are substituted with alkyl groups, e.g., lower alkyl of from 1 to 4 carbon atoms such as methyl, ethyl and butyl, halo groups particularly chloro and alkyloxy wherein the alkyl moiety has 1 to 4 carbon atoms and alkylcarboxy wherein the alkyl moiety has from 1 to 4 carbon atoms. Substitution of the pyridyl rings, when present, may be symmetrical or unsymmetrical. Illustrative 2,2'-bipryidines are 2,2'-bipyridine, 4,4'-dimethyl-2,2'-bipyridine, 4,4'-dichloro-2,2'bipyridine and 4,4'-dimethoxy-2,2'-bipyridine. Particularly preferred as the bidentate nitrogen ligand is 2,2'-bipyridine.

When bidentate ligands are employed in the catalyst compositions of the invention, quantities of nitrogen ligand from about 0.5 mol to about 200 mol per mol of palladium compound are satisfactory with quantities from about 1 mol to about 50 mol per mol of palladium compound being preferred.

It is useful on occasion, but optional, to employ additional largely conventional catalyst composition components which serve to increase catalyst activity. For example, when the bidentate ligand is a bidentate phosphorus ligand, addition of a component selected from ethers, esters and ketones is useful.

When an ether is added, the ether is cyclic or acyclic and is a monoether or a polyether of up to about 20 carbon atoms and 6 ether oxygens. Tetrahydrofuran is an example of a satisfactory monoether, but in general preference is given to polyethers. Linear polyethers include diglyme (the dimethyl ether of diethylene glycol) and tetraglyme (the dimethyl ether of tetraethylene glycol). Particularly useful are the cyclic polyethers, for example the crown ethers of the formula x crown y wherein x represents the number of carbon atoms and y the number of oxygen atoms in the ring. The ethers 12 crown 4, 15 crown 5 and 18 crown 6 are satisfactory.

Esters or ketones of from 3 to 20 carbon atoms inclusive are alternatively usefully employed in conjunction with the bidentate phosphorus ligand. The ester or ketone is acyclic or cyclic, is aliphatic, aromatic or mixed aliphatic and aliphatic, and is a monofunctional or polyfunctional ester or ketone.

Examples of cyclic esters and ketones are butyrolatone, cyclopentanone, cyclohexanone and cyclooctanone. Acyclic esters and ketones include methyl benzoate, benzophenone and acetophenone, dimethyl carbonate and hexanedione-2,5. Preferred ketones are dialkyl ketones such as diethyl ketone, methyl ethyl keton and acetone. Preferred esters are esters of aliphatic monoalcohols and mono- or dicarboxylic acids such as methyl acetate, methyl propionate and dimethyl oxylate, as well as aliphatic esters of dialcohols and monocarboxylic acids such as ethylene glycol diacetate, propylene glycol dipropionate and propylene glycol diacetate. A preferred class of esters and ketones comprises acetone and ethylene glycol diacetate.

When ester, ketone or ether is employed, quantities from about 0.5 mol to about 10,000 mol per mol of palladium compound are satisfactory, with quantities from about 1 mol to about 5,000 mol per mol of palladium compound being preferred.

When the bidentate ligand employed in the catalyst compositions of the invention is a bidentate nitrogen ligand, it is often useful, but not required, to add a quinone to the catalyst composition. Useful quinones are quinones of from 6 to 12 carbon atoms and are benzoquinones, naphthaquinones or anthraquinones. Preferred quinones are 1,4-quinones, particularly benzoquinone. When a quinone is used in conjunction with a bidentate nitrogen ligand, quantities from about 1 mol to about 10,000 mol per mol of palladium compound being satisfactory and from about 1 mol to about 5,000 mol being preferred.

The catalyst composition useful in the process of the invention is employed in catalytic quantities. Quantities of catalyst containing from about $1 \times 10^{-7}$ mol to about $1 \times 10^{-3}$ gram atom of palladium per mol of ethylenically unsaturated hydrocarbon are satisfactory with quantities containing from about $1 \times 10^{-6}$ to about $1 \times 10^{-4}$ gram atom of palladium per mol of unsaturated hydrocarbon being preferred.

The production of the polymers of the invention is carried out under polymerization conditions. Useful reaction temperatures vary from about 20° C. to about 200° C. with temperatures from about 30° C. to about 150° C. being preferred. Suitable pressures are from about 1 bar to about 200 bar, preferably from about 20 bar to about 100 bar. The polymerization is conducted in a gas phase or in liquid phase solution in a liquid diluent. when diluent is employed, lower alkanols such as methanol and ethanol are satisfactory.

The method of contacting reactants and catalyst is not critical and contact may be brought about by shaking, stirring or other conventional methods. Subsequent to reaction, the polymer product is recovered as by filtration or decantation. On occasion the polymer contains catalyst residues which are removed if desired by use of a solvent selective for the residues. However, utilization of the catalyst compositions of the invention employing quaternary phosphonium salts are less likely to produce polymer with metallic residues than similar polymerization processes which employ metal salts as the source of the anion A.

The polymers of the invention are known polymers and have good mechanical properties. They are processed by means of the usual techniques into films, sheets, plates, fibers and molded objects, for example. The polymers, being of relatively high molecular weight, are particularly suitable for applications in the auto industry, in the manufacture of containers for food and drink, as construction and building materials and other applications as premium thermoplastics. The polymers are modified by mixing or blending with other polymeric materials to produce mixtures or blends having varied and widespread application.

The invention will now be further illustrated by means of the following Illustrative Embodiments and Comparative Examples.

COMPARATIVE EXAMPLE I

To a mechanically stirred autoclave of 250 ml capacity was charged a catalyst solution comprising 50 ml of methanol, 0.1 mmol of palladium acetate, 2.2 mmol of tetrapropylammonium perchlorate and 0.15 mmol of 1,3-bis(diphenylphosphino)propane. Carbon monoxide was introduced into the autoclave until a pressure of 30 bar was reached and ethylene was added until a pressure of 60 bar was reached. The autoclave was heated to 80° C. and maintained for 5 hours at that temperature. The autoclave was then cooled to room temperature and the pressure was released. No more than a trace of polymer was obtained.

COMPARATIVE EXAMPLE II

The procedure of Comparative Example I was repeated except that the catalyst solution contained 25 ml of methanol and 25 ml of tetraglyme (dimethyl ether of tetraethylene glycol) instead of the 50 ml of methanol. Again, no more than a trace of polymer was obtained.

COMPARATIVE EXAMPLE III

The procedure of Comparative Example I was repeated except that the catalyst solution contained 1.8 mmol instead of 2.2 mmol of the ammonium compound and 3 mmol of 2,2'-bipyridine instead of the phosphinopropane. Again, no more than a trace of polymer was obtained.

COMPARATIVE EXAMPLE IV

The procedure of Comparative Example III was repeated except that the catalyst solution additionally contained 20 mmol of 1,4-benzoquinone. Again, no more than a trace of polymer was obtained.

ILLUSTRATIVE EMBODIMENT I

The procedure of Comparative Example I was essentially followed, except that the catalyst solution contained 2.2 mmol of methytriphenylphosphonium paratosylate instead of the quaternary ammonium compound, the reaction temperature was 90° C., and after the pressure was released, the polymer product was removed by filtration, washed with methanol and dried in vacuo at room temperature. The resulting product was a copolymer of carbon monoxide and ethylene in a quantity of 10 g. The calculated reaction (polymerization) rate was 200 g of copolymer/g Pd/hr.

ILLUSTRATIVE EMBODIMENT II

The procedure of Illustrative Embodiment I was repeated except that the catalyst solution contained 25 ml of methanol and 25 ml of tetraglyme instead of 50 ml of methanol and 1.9 mmol instead of 2.2 mmol of the phosphonium compound, the reaction temperature was 80° C. and the reaction time was 2 hours. The yield of copolymer was 22 g, produced at a calculated reaction rate of 1100 g of copolymer/g Pd/hr.

ILLUSTRATIVE EMBODIMENT III

The procedure of Illustrative Embodiment I was repeated except that the catalyst solution contained 3 mmol of 2,2'-bipyridine instead of the phosphinopropane and 1.8 mmol instead of 2.2 mmol of the phosphonium salt, and the reaction temperature was 100° C. instead of 90° C. The yield of polymer was 2 g, produced at a calculated reaction rate of 40 g of copolymer/g Pd/hr.

ILLUSTRATIVE EMBODIMENT IV

The procedure of Illustrative Embodiment III was repeated except that the catalyst solution additionally contained 20 mmol of 1,4-benzoquinone, the reaction temperature was 80° C. and the reaction time was 15 minutes. The yield of copolymer was 11 g, and the calculated reaction rate was 4400 g of copolymer/g Pd/hr.

ILLUSTRATIVE EMBODIMENT V

Similar results in the production of a carbon monoxide/ethylene/ propylene terpolymer will be obtained if propylene is added to the reaction mixture.

All of the carbon monoxide/ethylene copolymers of Illustrative Embodiments I-IV had melting points of 257° C. Using $^{13}$C-NMR analysis it was established that the copolymers had a linear alternating structure consisting of units of the formula $—CO(C_2H_4)—$.

What is claimed is:

1. In the process of producing linear alternating polymers of carbon monoxide and at least one olefinically unsaturated hydrocarbon under polymerization conditions in the presence of a catalyst composition formed from palladium compound, an anion of a non-hydrohalogenic acid having a pKa less than about 6 and a bidentate ligand selected from bidentate phosphorus ligand or bidentate nitrogen ligand, the improvement which comprises employing as source of the anion, the quaternary phosphonium compound of the formula $$Z_4PA$$

wherein A is the anion of an oxygen containing acid having a pKa less than about 6 and Z independently is hydrocarbyl group of from 1 to 20 carbon atoms inclusive.

2. The process of claim 1 wherein A is the anion of an acid having a pKa less than about 2.

3. The process of claim 2 wherein from 1 to 3 Z groups are phenyl.

4. The process of claim 3 wherein A is the anion of an acid selected from trifluoroacetic acid or para-toluenesulfonic acid.

5. The process of claim 4 wherein the quaternary phosphonium salt is an alkyltriphenylphosphonium salt.

6. The process of claim 5 wherein the alkyltriphenylphosphonium salt is a methyltriphenylphosphonium salt.

7. In the process of producing linear alternating polymers of carbon monoxide and ethylenically unsaturated hydrocarbon selected from ethylene or mixtures of ethylene and propylene, in the presence of a catalyst composition formed from palladium acetate, the anion of an acid selected from trifluoroacetic acid or para-toluenesulfonic acid and 1,3-bis(diphenylphosphino)propane, the improvement which comprises employing as the source of the anion a methyltriphenylphosphonium salt.

* * * * *